(12) United States Patent
Kuo

(10) Patent No.: US 6,241,507 B1
(45) Date of Patent: Jun. 5, 2001

(54) DEVICE FOR ALIGNING AN INJECTION NOZZLE WITH A MOLD SPRUE

(75) Inventor: Peter Kuo, Chung-Ho (TW)

(73) Assignee: Hon Ahi Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/334,580

(22) Filed: Jun. 16, 1999

(30) Foreign Application Priority Data

Nov. 17, 1998 (TW) .................................................. 87118996

(51) Int. Cl.[7] .................................................. B29C 45/17
(52) U.S. Cl. ............................................. 425/472; 33/613
(58) Field of Search .................................. 425/569, 472, 425/190; 264/39, 465; 33/613, 626, 644, 645

(56) References Cited

U.S. PATENT DOCUMENTS

| 1,141,396 | * | 6/1915 | Jubinville | 33/642 |
|---|---|---|---|---|
| 1,470,679 | * | 10/1923 | Bellringer | 408/83.5 |
| 2,466,380 | * | 4/1949 | Clark | 33/642 |
| 2,484,801 | * | 10/1949 | Anderson | 33/644 |
| 2,685,824 | * | 8/1954 | Coop | 269/317 |
| 4,447,956 | * | 5/1984 | Chung | 33/172 D |
| 4,982,489 | * | 1/1991 | Haugen | 29/402.01 |
| 5,299,346 | * | 4/1994 | Kilgore et al. | 29/33 K |

* cited by examiner

Primary Examiner—Harold Pyon
Assistant Examiner—Emmanuel Luk
(74) Attorney, Agent, or Firm—Wei Te Chung

(57) ABSTRACT

An aligning device includes a barrel defining an interior space for receiving a spring therein. The barrel has first and second axial ends to which a nozzle aligning member and a sprue aligning member are respectively mounted. The sprue aligning member has a pin inserted into a sprue of a mold for removably fixing the aligning device on the mold. The nozzle aligning member is spring-biased to have a projection thereof in contact with a nozzle of an injection molding apparatus. Thus, by moving the mold and the aligning device with respect to the nozzle until an end of the projection is inserted into the nozzle, an exact alignment between the nozzle and the sprue is accomplished.

3 Claims, 5 Drawing Sheets

DEVICE FOR ALIGNING AN INJECTION NOZZLE WITH A MOLD SPRUE

BACKGROUND OF THE INVENTION

1. Field of the Invention

The present invention generally relates to a device for aligning a nozzle of an injection unit of a vertical injection molding apparatus with a sprue of a mold.

2. The Prior Art

In injection molding, high temperature melted plastic is injected via a nozzle into a mold under great pressure. The temperature and pressure of the melted plastic often damages the mold. Furthermore, the mold undergoes wear and abrasion. Thus, the mold of an injection molding apparatus requires frequent maintenance and replacement in order to maintain precise molding dimensions. Maintenance of the mold requires the mold to be removed from the apparatus and then remounted in the apparatus for further operation. When remounting the mold to the apparatus, an adjustment of the relative position between the mold and the injection nozzle must be performed in order to exactly align the nozzle with a sprue of the mold. Conventionally, this is done by manually moving the mold with respect to the nozzle and then visually checking for perfect alignment therebetween. The process must be repeated several times until perfect alignment is obtained, which is time-consuming and laborious.

It is thus desirable to provide an aligning device for aligning an injection nozzle with a mold sprue and a method of using the aligning device to readily align the nozzle with the sprue.

SUMMARY OF THE INVENTION

Accordingly, an object of the present invention is to provide an aligning device for aligning an injection nozzle of an injection molding apparatus with a spruce of a mold when mounting the mold to the injection molding apparatus.

Another object of the present invention is to provide a method for efficiently aligning an injection nozzle of an injection molding apparatus with a spruce of a mold when mounting the mold to the injection molding apparatus.

To achieve the above objects, an aligning device in accordance with the present invention comprises a barrel defining an interior space for receiving a spring therein. The barrel has first and second axial ends to which a nozzle aligning member and a sprue aligning member are respectively mounted. The sprue aligning member has a pin inserted into a sprue of a mold for removably fixing the aligning device on the mold. The nozzle aligning member is spring-biased to have a projection thereof in contact with a nozzle of an injection molding apparatus. Thus, by moving the mold and the aligning device with respect to the nozzle until an end of the projection is inserted into the nozzle, an exact alignment between the nozzle and the sprue is accomplished.

BRIEF DESCRIPTION OF THE DRAWINGS

The present invention will be apparent to those skilled in the art by reading the following description of preferred embodiments thereof, with reference to the accompanying drawings, in which:

FIGS. 3A–3E are schematic, sequential views showing the process of aligning an injection nozzle with respect to a sprue of a mold in accordance with the present invention, wherein FIG. 3C is an enlarged view of the encircled portion labeled 3C in FIG. 3B but showing the nozzle contacting the aligning device;

DETAILED DESCRIPTION OF PREFERRED EMBODIMENTS

Figure 1:
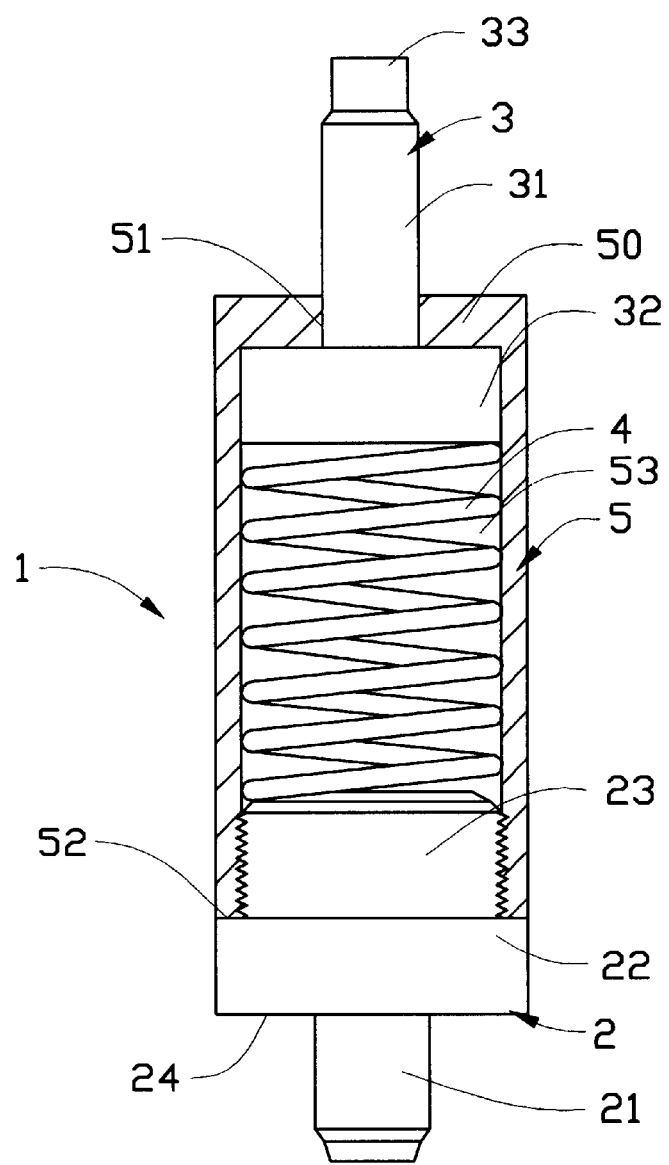
FIG. 1 is a cross-sectional view of an aligning device constructed in accordance with a first embodiment of the present invention.
Figure 2:
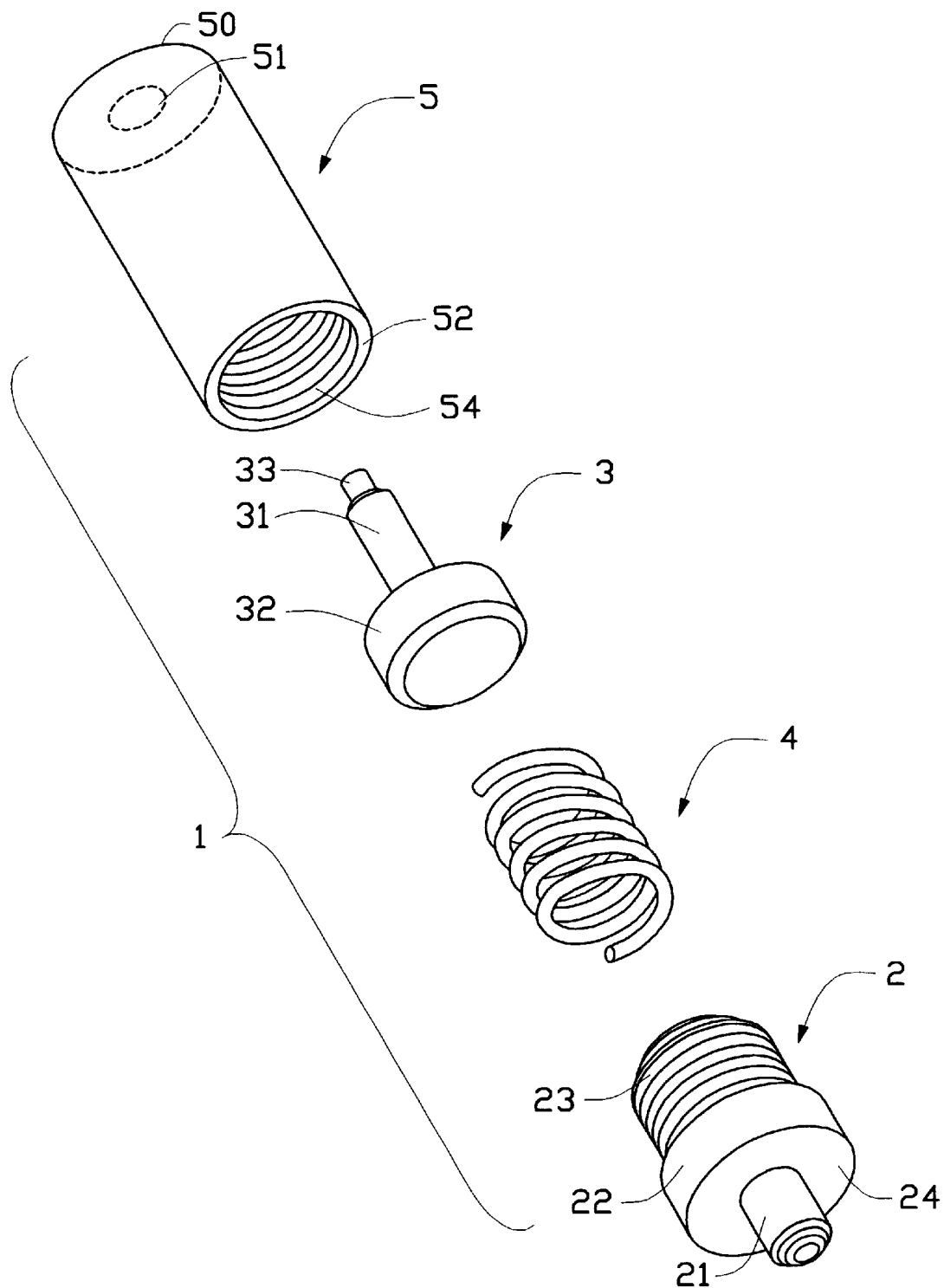
FIG. 2 is an exploded view of the aligning device shown in FIG. 1.

Referring to the drawings and in particular to FIGS. 1 and 2, wherein an aligning device 1 in accordance with the present invention comprises a cylindrical barrel 5 having a central axis (not labeled) and first and second axial ends 50, 52. The barrel 5 defines an interior space 53 for receiving a biasing element, such as a spring 4, therein. A central bore 51 is defined in the first end 50 in communication with the interior space 53. A nozzle aligning member 3 comprises a disk 32 axially and movably received in the interior space 53 of the barrel 5 and biased by the spring 4 toward the first end 50 of the barrel 5. A projection 31 extends from the disk 32 along the central axis of the barrel 5. The projection 31 has an end 33 extending through the central bore 51 of the barrel 5 and beyond the first end 50 of the barrel 5.

A sprue aligning member 2 comprises a base 22 fixed to the second end 52 of the barrel 5 and having a support surface 24. A pin 21 extends from the support surface 24 of the base 22 along the central axis in a direction opposite the projection 31 of the nozzle aligning member 3 whereby the pin 21 and the projection 31 are axially aligned with each other. Preferably, the second end 52 of the barrel 5 defines an inner-threaded hole 54 and the sprue aligning member 2 has a threaded section 23 threadingly engaging with the inner-threaded hole 54 of the barrel 5 for fixing the pin 21 to the second end 52 of the barrel 5.

Figure 3A:
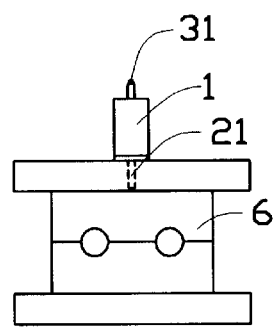

Referring to FIGS. 3A–3E, in use, the pin 21 of the sprue aligning member 2 is inserted into a sprue (not shown) of a mold 6 with the support surface 24 supported on the mold 6 as shown in FIG. 3A for removably fixing the aligning device 1 to the mold 6.

Figure 3B:
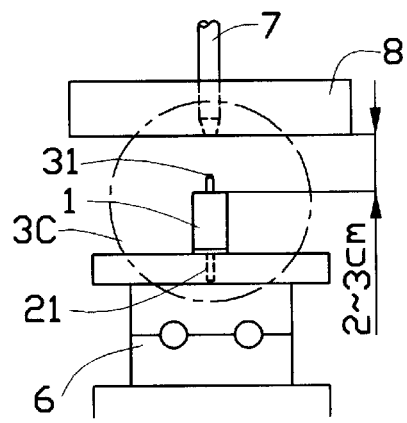
Figure 3C:
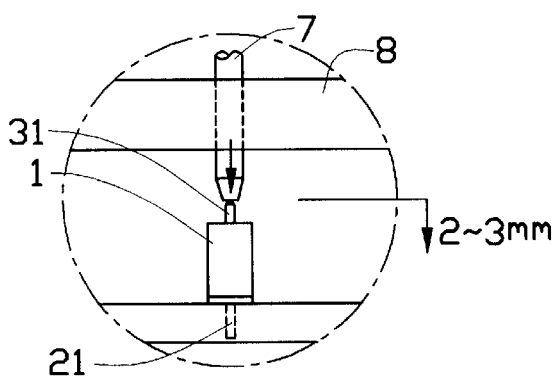

An injection nozzle 7 supported on a support 8 is moved close to the aligning device 1 by moving the support 8 for providing a rough alignment therebetween whereby a predetermined distance, such as 2–3 cm, is present between the nozzle 7 and the projection 31 as shown in FIG. 3B. The nozzle 7 is then moved to contact and depress the projection 31 a distance, such as 2–3 cm as shown in FIG. 3C.

Figure 3E:
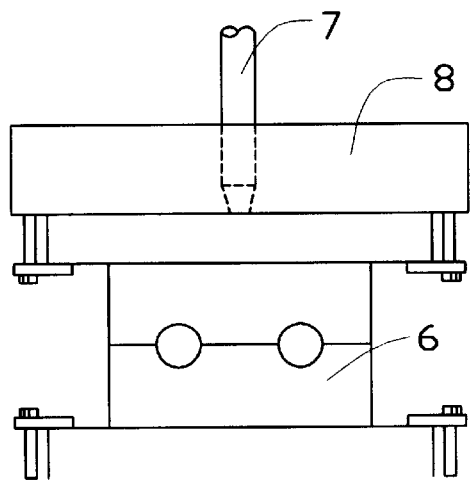
Figure 3D:
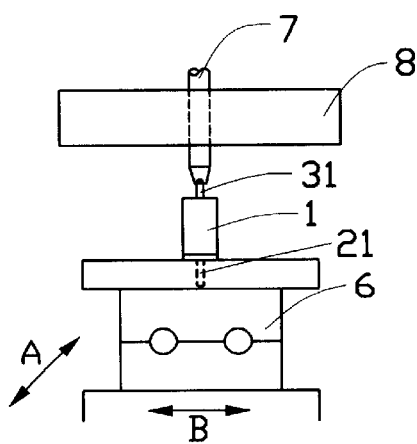

An adjustment of the relative position of the nozzle 7 with respect to the projection 31 is then carried out by moving the mold 6 and the aligning device 1 as indicated by arrows A and B shown in FIG. 3D whereby the end 33 of the projection 31 is inserted into the nozzle 7 and is biased by the spring 4 and the adjustment ends. The adjustment exactly aligns the nozzle 7 with the sprue of the mold 6. The nozzle 7 is then moved away and the aligning device 1 removed as shown in FIG. 3E.

Figure 4:
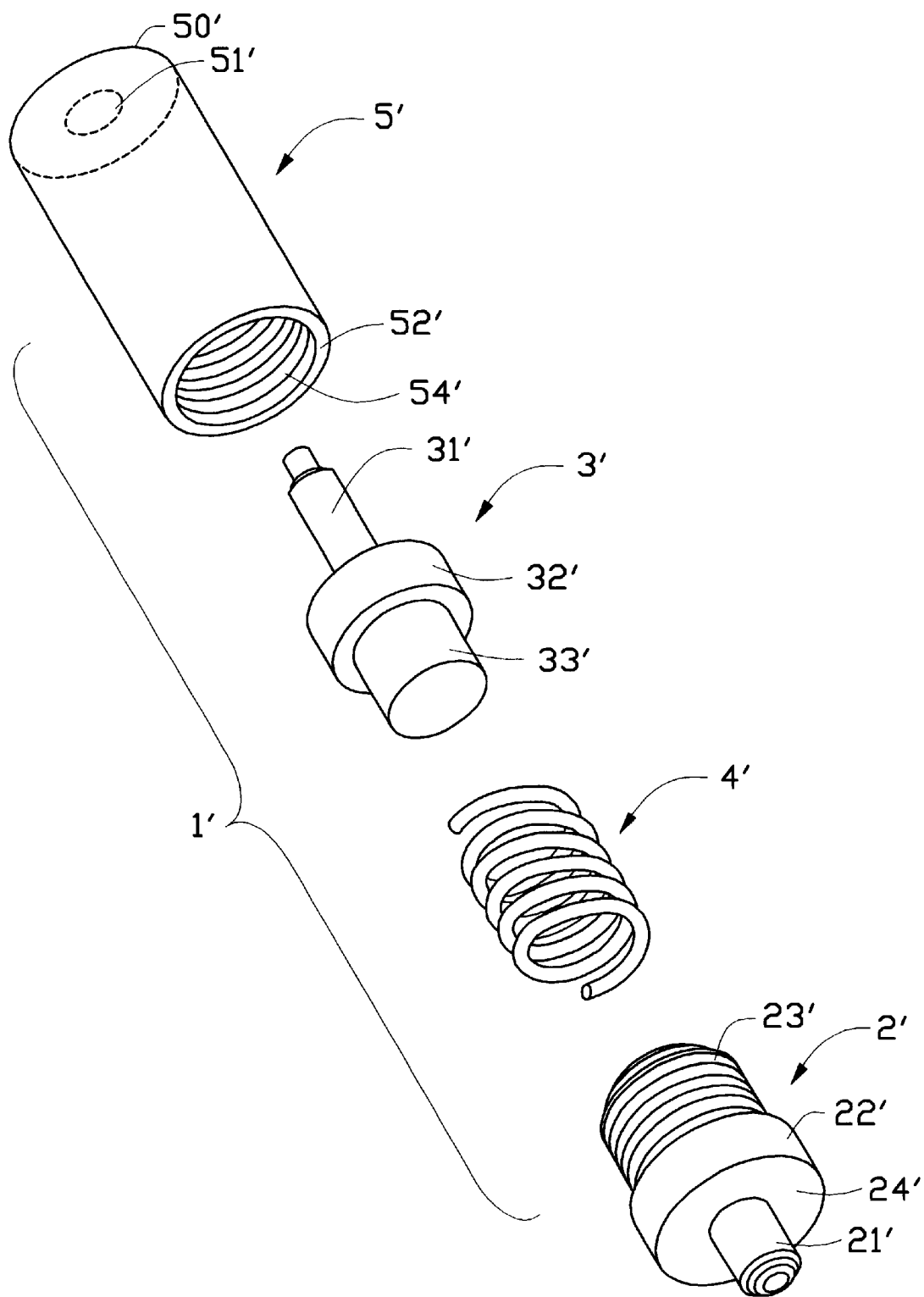
FIG. 4 is an exploded view of an aligning device constructed in accordance with a second embodiment of the present invention.
Figure 5:
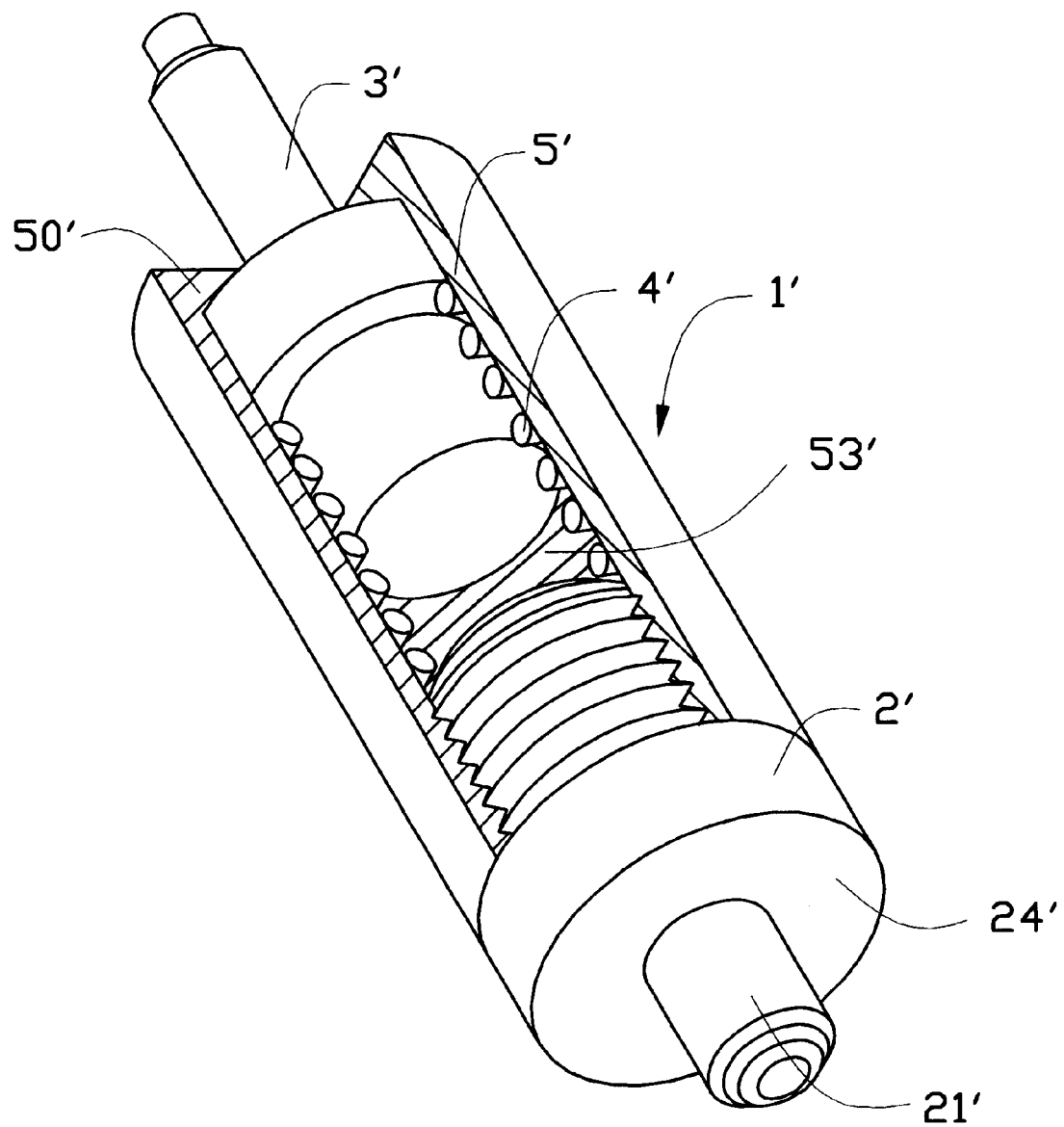
FIG. 5 is a perspective view, partially cut away, of the aligning device of FIG. 4.

FIGS. 4 and 5 show a second embodiment of the present invention. The aligning device 1' of the second embodiment comprises a barrel 5' having first and second axial ends 50', 52'. A central bore 51' is defined in the first end 50'. A nozzle aligning member 3' comprises a disk 32' axially and movably received in an interior space 53' defined in the barrel 5' and a projection 31' extending from the disk 32' and through the central bore 51' for being contacted by the nozzle 7. A spring 4' is received in the barrel 5' and biases the disk 32' toward the first end 50' of the barrel 5'. The disk 32' has a second projection 33' extending into the interior space 53' of the barrel 5' to be partially encompassed by the spring 4' for retaining the spring 4' in position.

The second end 52' of the barrel 5' defines an inner-threaded hole 54' with which a threaded section 23' of a sprue aligning member 2' engages for fixing the sprue aligning member 2' to the second end 52' of the barrel 5'. The sprue aligning member 2' comprises a base 22' having a support surface 24' adapted to be positioned on the mold 6 and a pin 21' extending from the support surface 24' for being inserted into the sprue of the mold 6.

The use of the second embodiment 1' is exactly the same as that of the first embodiment 1 whereby no further description is needed herein.

Although the present invention has been described with reference to preferred embodiments and a best mode for carrying out the aligning operation between the nozzle and the spruce, it is apparent to those skilled in the art that a variety of modifications and changes may be made without departing from the scope of the present invention which is intended to be defined by the appended claims.

What is claimed is:

1. An aligning device adapted to align an injection nozzle with a sprue of a mold comprising:

a barrel defining an interior space therein and a central axis lengthwise, the barrel having first and second axial ends, the first end defining a central bore therein;

a sprue aligning member including a base fixed to the second end of the barrel and a pin extending from the base in a first direction along the central axis, the pin being removeably received within the sprue of the mold;

a nozzle aligning member including a disk axially movably received in the interior space of the barrels the disk having a projection extending in a second direction opposite to the first direction through the central bore of the barrel, the projection having a free end receivable within the nozzle; and a spring disposed arranged between the sprue aligning member and the nozzle aligning member for biasing the nozzle aligning member away from the sprue aligning member;

whereby by moving the mold with respect to the nozzle in a manner such that the free end of the projection of the nozzle aligning member is received within the nozzle without any compression of the spring, the nozzle is exactly aligned with the sprue of the mold.

2. The aligning device as claimed in claim 1, wherein the second end of the barrel defines an inner-threaded hole engaging with a threaded section of the sprue aligning member.

3. The aligning device as claimed in claim 1, wherein the disk of the nozzle aligning member comprises a second projection extending into the interior space of the barrel and partially encompassed by the spring for retaining the spring in position.

* * * * *